US007456748B2

(12) United States Patent
Cheng et al.

(10) Patent No.: US 7,456,748 B2

(45) Date of Patent: Nov. 25, 2008

(54) RFID ANTENNA WITH PRE-APPLIED ADHESIVES

(75) Inventors: Chih-Min Cheng, Westford, MA (US); Vito Buffa, Hopkinton, MA (US)

(73) Assignee: National Starch and Chemical Investment Holding Corporation, New Castle, DE (US)

( * ) Notice: Subject to any disclaimer, the term of this patent is extended or adjusted under 35 U.S.C. 154(b) by 148 days.

(21) Appl. No.: 11/255,117

(22) Filed: Oct. 20, 2005

(65) Prior Publication Data

US 2007/0089286 A1 Apr. 26, 2007

(51) Int. Cl.
*G08B 13/14* (2006.01)

(52) U.S. Cl. .................. 340/572.7; 340/572.1; 156/60; 343/873; 343/895; 29/825; 29/846

(58) Field of Classification Search ............. 340/572.7, 340/572.1; 343/873, 895, 853; 156/264, 156/299, 60, 269; 29/825, 846, 847
See application file for complete search history.

(56) References Cited

U.S. PATENT DOCUMENTS 6,951,596 B2 * 10/2005 Green et al. ................ 156/264
7,064,011 B2 * 6/2006 Ikenaga et al. ............. 438/118
7,102,520 B2 * 9/2006 Liu et al. ................. 340/572.1
7,141,451 B2 * 11/2006 Tsunoda et al. ............. 438/113
7,224,280 B2 * 5/2007 Ferguson et al. ......... 340/572.7
7,312,534 B2 * 12/2007 delos Santos et al. ....... 257/783

OTHER PUBLICATIONS

Kevin Chung, Low Cost and Reliable RFID Tags for All Frequencies, Avante Int'l Tech. Inc., Nov. 14, 2004.

Chih-Min Cheng, et al., Conductive Adhesives for RFID Assembly: Low Temperature Snap Cure Thermosets, Emerson & Cuming Sep. 2, 2003.

* cited by examiner

*Primary Examiner*—Davetta W Goins
(74) *Attorney, Agent, or Firm*—Sun Hee Lehmann

(57) ABSTRACT

A radio frequency identification ("RFID") system antenna having adhesive pre-applied to one or more of its contact pads to allow for high speed attachment of the antenna to the RFID die or die strap. Also disclosed is a method for attaching an RFID antenna having pre-applied adhesive to a die or die strap.

9 Claims, 1 Drawing Sheet

10
11
15

RFID ANTENNA WITH PRE-APPLIED ADHESIVES

FIELD OF THE INVENTION

The present invention relates to an antenna with a pre-applied adhesive for use with a radio frequency identification system and a method for assembling a radio frequency identification system using an antenna with a pre-applied adhesive.

BACKGROUND OF THE ART

Radio frequency identification systems ("RFID") are frequently utilized in many applications, such as electronic surveillance and inventory tracking. RFID systems typically consist of a data carrier, such as a tag or transponder, and a reader. The tags or transponders are used in various formats, such as disks, smart cards, plastic housings, or in paper-thin tags. The tags consist of a silicon die attached to the contact pads on the antenna. Anisotropic or isotropic conductive pastes, anisotropic conductive films and non-conductive pastes are utilized to attach the antenna to the die. To attach the silicone chip to the antenna, manufacturers frequently utilize semiconductor flip chip technology processes. Via the flip chip process, the radio frequency identification dies are picked and placed onto the antenna after an anisotropic conductive adhesive is applied to the pads. The adhesive is then cured at a high temperature for a short time while pressure is applied on top of the die to ensure electrical connection. Due to a number of variables, the flip chip process often has the drawback of a relatively slow processing speed In all of the existing processes for assembling RFID systems adhesives are applied in a liquid or film form immediately before the die is attached to the antenna after which the unit is cured via heat or energy radiation. Numerous difficulties are presented by the use of such adhesives. For example, the die are extremely small and usually only a few millimeters square in size. Thus, the distances between the attachment bumps on the die are too small to utilize isotropic conductive paste.

Die straps which allow for high speed reel-to-reel processing of the interconnection between the die and the antenna may be utilized. Such high speed processing is critical to manufacturers in order to produce the extremely large number of tags utilized in various industries. The use of high speed processing poses a number of difficulties for manufacturers. For example, high speed processing limits the type of adhesive application techniques and the type of adhesive that may be utilized. A low viscosity adhesive is required for high speed adhesive deposition. However, a low viscosity adhesive tends to have low green strength. Low green strength may cause the die to short after placement on the antenna pads because of the vibration experienced during high web processing speeds. Further, as adhesive has a limited work life, there will be a limited time during which the adhesive may be applied without a variation in its viscosity. To avoid the variation, manufacturers are required to interrupt the assembly process to insert fresh conductive adhesive, resulting in an inefficient process having downtime. It would be advantageous to provide an RFID antenna that could be readily utilized in a high speed assembly process along with a method for assembling RFID systems at a high speed.

SUMMARY OF THE INVENTION

The present invention discloses an RFID antenna having adhesive pre-applied to one or more of its contact pads to allow for high speed attachment of the antenna to the RFID die or die strap. Also disclosed is a method for attaching an RFID antenna having pre-applied adhesive to a die or die strap.

DETAILED DESCRIPTION OF THE PREFERRED EMBODIMENTS

During assembly of RFID systems, RFID antennas are attached to the die or die strap to form an RFID data carrier. In order to facilitate high speed processing of the systems, it is desirable to utilize pre-applied adhesives on the contact pads of the RFID antennas. While the present application discusses antennas having two contact pads, it is possible for the antenna to have more than two contact pads and such embodiments are also within the scope of this invention. Antennas with pre-applied adhesive will simplify the die attach assembly process and reduce the production cost to the RFID manufacturers. Currently, RFID system manufacturers apply the adhesives to the antenna, resulting in additional steps in the assembly process. Through the use of the antennas with pre-applied adhesive of the present invention, the RFID system production time will not be limited by the ability to apply adhesives at a sufficiently high speed. The RFID system manufacturers will not be exposed to liquid adhesives, resulting in reduced waste, cleanup time and maintenance time, along with a reduced risk of exposure of its personnel to hazardous chemicals. Further, the softened or melted pre-applied adhesives of the present invention will possess a higher green strength than the liquid adhesives currently utilized resulting in a reduction of mis-alignments between the die and antenna contact pads before curing of the adhesive. Overall, the use of the pre-applied adhesives on the antenna will result in less processing variability and better interconnect quality.

Various types of adhesives, including liquid paste, with or without solvent, and films may be utilized as a pre-applied adhesive on the antenna. The adhesives may be based on either thermo set or thermoplastic chemistry and should preferably have quick or snap bond capability. Depending upon the desired use, the adhesive may be either electrically conductive or electrically non-conductive. In the case that the adhesive is electrically conductive, it may be either anisotropic or isotropic.

Figure 1:
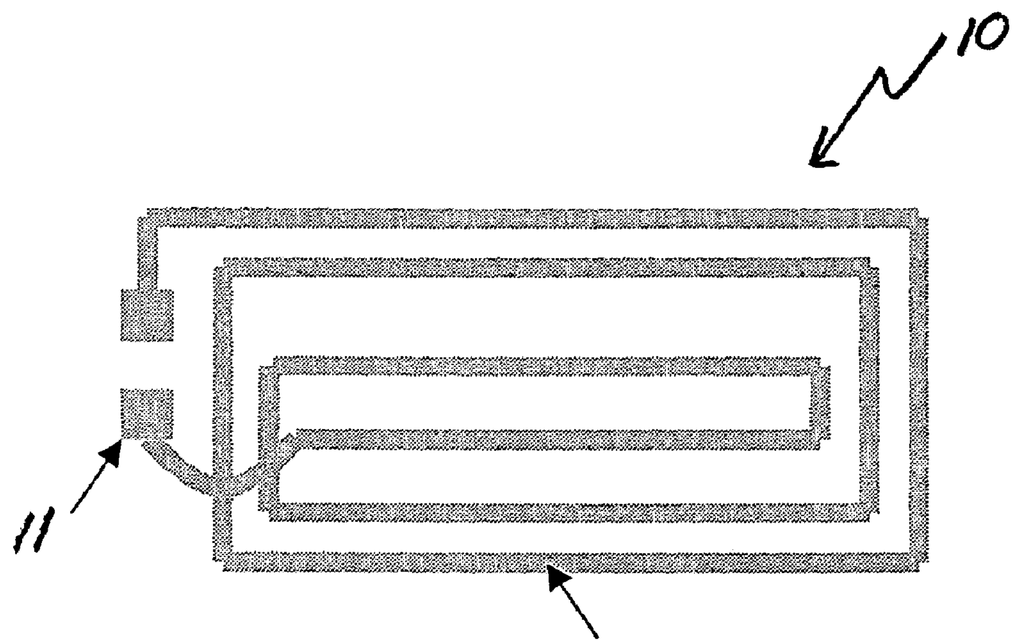
FIG. 1 is a top view of an RFID antenna.
Figure 2:
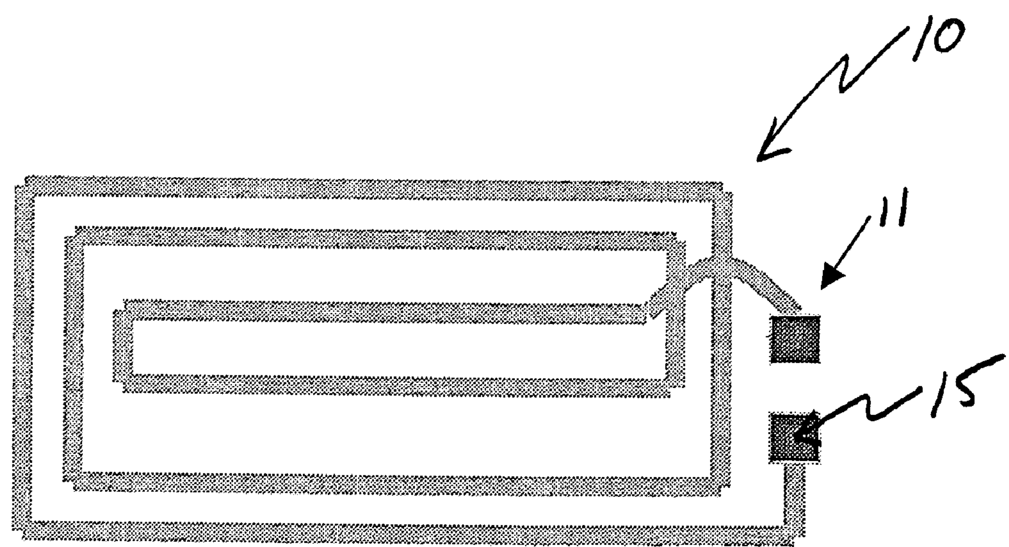
FIG. 2 is a top view of an RFID antenna having adhesive pre-applied to its contact pads.

FIG. 1 illustrates a typical RFID antenna 10. Despite the illustrated configuration of antenna 10, the antenna may be in virtually any desired shape. Contact pads 11 for attachment of the antenna to the die are located at each end of the antenna. FIG. 2 illustrates antenna 10 having pre-applied adhesive 15 on contact pads 11. The pre-applied adhesive would, after application, be in the form of a film that would be capable of reverting to a softened state at a sufficiently high temperature and then bonding the die to the antenna if it is a thermally activated film. One the other hand, if the film is pressure sensitive in nature, then the die can be attached to the antenna with pressure.

In the method of pre-applying the adhesive, an antenna having at least two contact pads is first provided. Antennas are typically prepared with wet processes, such as screen printing of conductive inks or solution etching of copper/aluminum foil. Next, an adhesive is deposited on one or more of the contact pads. The adhesive may be applied to the antenna via conventional printing or dispensing techniques at either room temperature or, if necessary, high temperature. The adhesive may be applied as a film or in a form capable of forming a film on the contact pad and may be either conductive or non-conductive. The adhesive may then be B-staged onto the antenna contact pads or B-staged onto release liner prior to placement on the antenna contact pads. Many types of adhesives, including solvent-based adhesives, hot melt adhesives and also adhesives with dual cure mechanisms are suitable as B-stage adhesives. A solvent-based adhesive, for example, is B-staged onto the antenna contact pad by the evaporation of the solvent. A hot melt adhesive, on the other hand, is B-staged onto the antenna contact pad after cooling back to room temperature. In a further embodiment, a pressure sensitive adhesive may be utilized. Finally, an adhesive with multiple cure mechanisms is B-staged by partially curing the adhesive through the primary cure mechanism. The primary cure mechanism may consist of a thermal cure with a low temperature hardener or a UV cure hardener. Regardless of the method used to B-stage the adhesive, this process results in the formation of an adhesive film, at room temperature, on the antenna contact pads. For bonding of the antenna to the die, the antenna with the pre-applied adhesives is first brought into contact with the die or die strap. If a thermally activated film is used, the assembly is then heated to a temperature sufficiently high to facilitate adhesive wetting. Wetting is crucial for proper bonding. During the heating process, the pre-applied adhesive softens and then adheres the die or die strap to the antenna. If the film is pressure sensitive in nature, then heat is not required. The die is then attached to the antenna with pressure.

The pre-applied adhesive provides the numerous benefits to the manufacture and process of RFID antennas. For example, the pre-applied adhesive allows for fast, simplified processing for tag assemblers. Further, the pre-applied adhesive eliminates the capital expense required for tag assembly companies to apply the adhesive necessary for the attachment of the die or die strap.

Many modifications and variations of this invention can be made without departing from its spirit and scope, as will be apparent to those skilled in the art. The specific embodiments described herein are offered by way of example only, and the invention is to be limited only by the terms of the appended claims, along with the full scope of equivalents to which such claims are entitled.

We claim:

1. A method of assembling a radio frequency identification system comprising:

(a) providing a radio frequency identification antenna having more than one contact pad;

(b) applying a pre-applied adhesive to at least one of the more than one contact pads;

(c) B-staging the adhesive to form a film;

(d) contacting said radio frequency identification antenna to a die or a die strap; and (e) activating said film.

2. The method of claim 1, wherein the adhesive is on a release liner.

3. The method of claim 1, wherein the activating includes heating the system to a temperature sufficiently high to cause wetting of the film.

4. The method of claim 1, wherein the adhesive is a pressure sensitive adhesive.

5. The method of claim 1, wherein the adhesive is a thermoplastic.

6. The method of claim 1, wherein the adhesive is electrically conductive.

7. The method of claim 6, wherein the adhesive is anisotropic.

8. The method of claim 1, wherein the adhesive is a thermoset.

9. The method of claim 6, wherein the adhesive is isotropic.

* * * * *